(12) United States Patent
Palmer

(10) Patent No.: US 8,794,659 B1
(45) Date of Patent: Aug. 5, 2014

(54) VEHICLE STYLE STROLLER

(71) Applicant: Steven W. Palmer, Elmira, MI (US)

(72) Inventor: Steven W. Palmer, Elmira, MI (US)

( * ) Notice: Subject to any disclaimer, the term of this patent is extended or adjusted under 35 U.S.C. 154(b) by 0 days.

(21) Appl. No.: 13/849,209

(22) Filed: Mar. 22, 2013

(51) Int. Cl.
*B62B 7/10* (2006.01)

(52) U.S. Cl.
CPC ..................................... *B62B 7/105* (2013.01)
USPC ........................................................ 280/648

(58) Field of Classification Search
CPC .............................................. B62B 7/00–7/147
See application file for complete search history.

(56) References Cited

U.S. PATENT DOCUMENTS

| | | | | |
|---|---|---|---|---|
| 1,125,441 A * | 1/1915 | Bailey | | 280/37 |
| 1,570,410 A * | 1/1926 | Strauss | | 280/7.1 |
| 2,402,046 A * | 6/1946 | Holder | | 280/7.17 |
| D157,737 S * | 3/1950 | Chance | | D12/129 |
| 2,634,791 A * | 4/1953 | Weirich | | 280/7.1 |
| 2,986,400 A * | 5/1961 | Phillips | | 280/7.17 |
| 3,679,223 A * | 7/1972 | Sakal | | 280/37 |
| 4,019,751 A * | 4/1977 | Nakao | | 280/31 |
| 4,065,086 A * | 12/1977 | Nakao | | 248/188.6 |
| 4,089,543 A * | 5/1978 | Osborne | | 280/647 |
| 4,261,588 A * | 4/1981 | Kassai | | 280/7.17 |
| 4,741,544 A * | 5/1988 | Kassai | | 280/1.13 |
| D305,011 S * | 12/1989 | Pipon | | D12/129 |
| D332,592 S * | 1/1993 | O'Dea et al. | | D12/129 |
| 5,318,311 A * | 6/1994 | Bofill | | 280/30 |
| 5,431,478 A * | 7/1995 | Noonan | | 297/130 |
| 5,441,289 A * | 8/1995 | Spielberger | | 280/87.051 |
| D364,132 S | 11/1995 | Badon et al. | | |
| D365,311 S | 12/1995 | Mosetich et al. | | |
| D365,312 S | 12/1995 | Mosetich et al. | | |
| D365,313 S | 12/1995 | Mosetich et al. | | |
| D369,993 S | 5/1996 | Gonzales | | |
| 5,645,290 A * | 7/1997 | Gaffney et al. | | 280/33.998 |
| D388,027 S | 12/1997 | Polak et al. | | |
| D388,367 S | 12/1997 | Polak et al. | | |
| 5,692,760 A * | 12/1997 | Pickering | | 280/7.17 |
| D389,438 S | 1/1998 | Guichard et al. | | |
| D391,520 S | 3/1998 | Laster | | |
| D394,831 S | 6/1998 | Polak et al. | | |
| D401,186 S | 11/1998 | Abbott et al. | | |
| 5,884,922 A * | 3/1999 | Pickering | | 280/7.17 |
| D410,502 S | 6/1999 | Harrod | | |
| D411,490 S * | 6/1999 | Pierce | | D12/129 |
| 6,231,056 B1 * | 5/2001 | Wu | | 280/7.17 |
| 6,250,652 B1 * | 6/2001 | Nelson | | 280/47.38 |
| 6,394,633 B1 | 5/2002 | Perez | | |
| 6,536,786 B1 * | 3/2003 | Katoozian | | 280/33.993 |
| 6,877,763 B2 * | 4/2005 | Ulrich | | 280/649 |
| D507,766 S | 7/2005 | McMahan et al. | | |
| 6,916,028 B2 * | 7/2005 | Shapiro | | 280/47.34 |
| 7,007,975 B2 * | 3/2006 | Taylor et al. | | 280/781 |
| 7,025,364 B1 * | 4/2006 | Clarke | | 280/87.051 |
| D564,040 S * | 3/2008 | Kurth et al. | | D21/433 |
| 7,832,757 B2 * | 11/2010 | McCabe | | 280/650 |

* cited by examiner

*Primary Examiner* — Jeffrey J Restifo
*Assistant Examiner* — Erez Gurari
(74) *Attorney, Agent, or Firm* — Northern Michigan Patent Law, PLC

(57) ABSTRACT

A stroller having a folding tubular frame mounted on an independently-wheeled stroller body having the appearance of a real-life vehicle. The body includes a hollow open passenger compartment corresponding to the passenger compartment of a real vehicle, and an empty engine storage compartment closed by a hood forward of the passenger compartment. The hood is movable to an open position in which the stroller frame can be folded down for storage into both the passenger compartment and the engine compartment. The body also includes a folding windshield mounted on the hood, and a pull handle on a rear bumper.

14 Claims, 10 Drawing Sheets

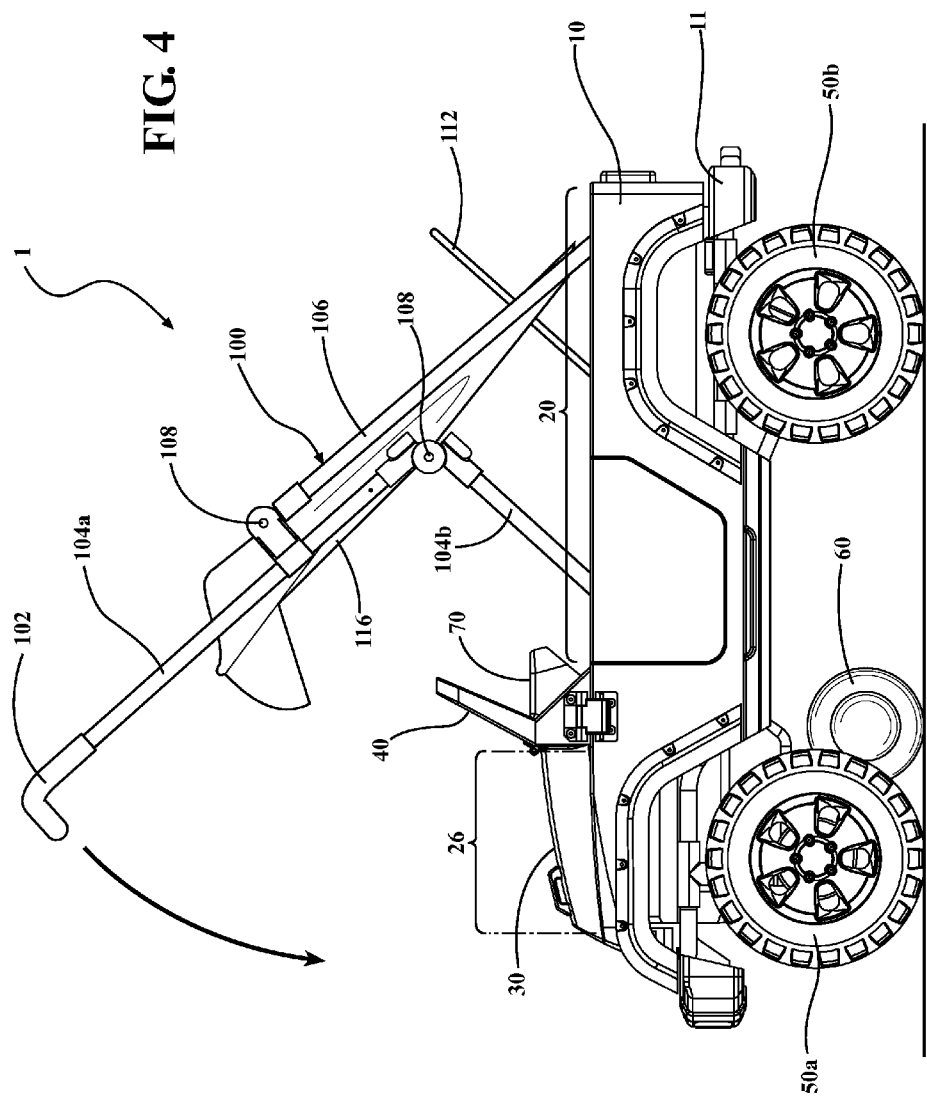

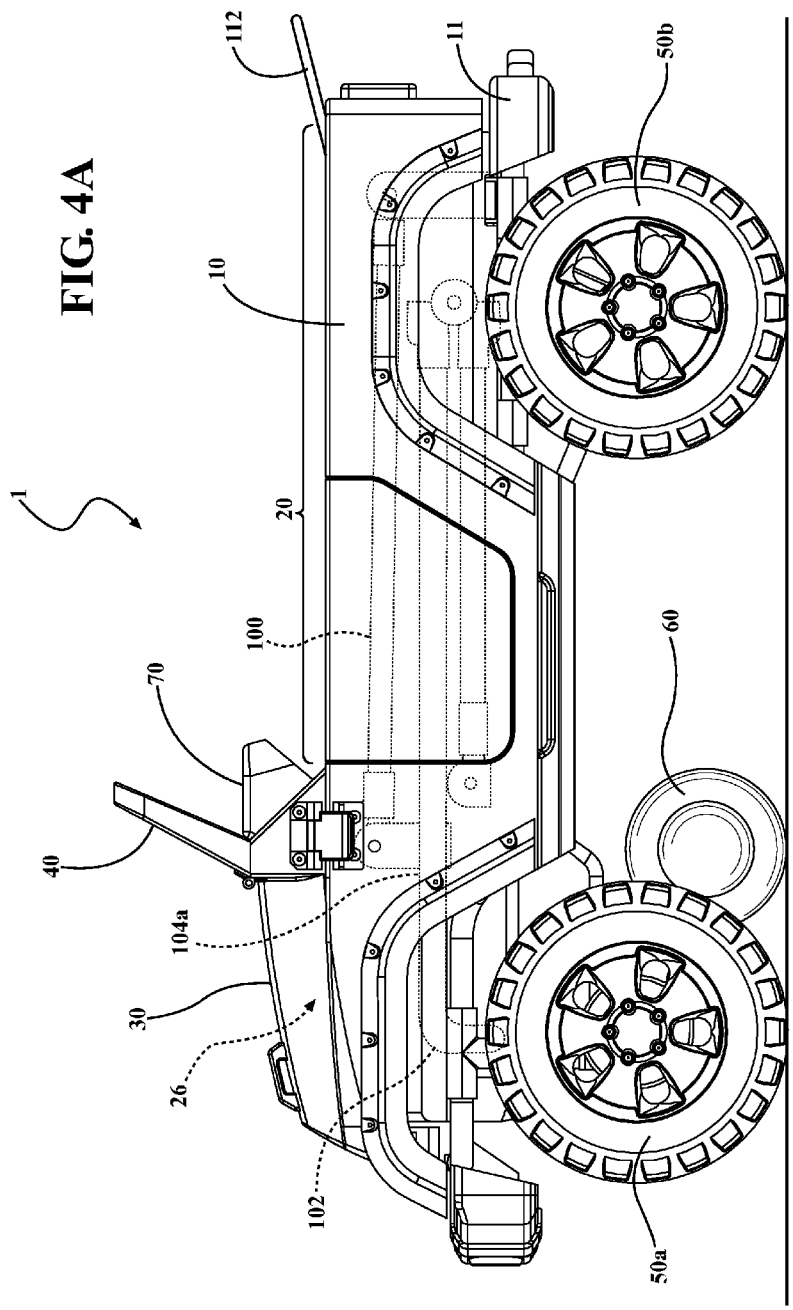

VEHICLE STYLE STROLLER

RELATED APPLICATIONS/PRIORITY BENEFIT CLAIM

None.

FIELD

The subject matter of the present application is in the field of strollers for infants and small children.

BACKGROUND

Strollers with exterior decorative bodies made to look like automotive vehicles are known. Examples include those shown in U.S. Pat. No. D411,490 to Pierce (box car stroller with rear mounted push handle); U.S. Pat. No. 7,832,757 to McCabe (folding stroller with tubular structural frame and attachable decorative "skirt" to look like vehicle); U.S. Pat. No. 6,250,652 to Nelson (automobile cover stroller with box type seat, front swivel caster wheels, and raised decorative front automobile wheels normally not in contact with ground but rollable if stroller is tilted to stabilize front end); U.S. Pat. No. 5,645,290 to Gaffney et al. (stackable, non-folding stroller with automobile type molded body); U.S. Pat. No. 6,394,633 to Perez (conventional stroller design with built-in battery headlamps, side lamps, and tail-lamps for illumination); D365,211 and D365,312 to Mosetich et al (toddler strollers with raisable shade covers); and U.S. Pat. No. 4,089,543 to Osborne (baby carriage stroller with hollow main automobile body, in which upper body portion is foldable into lower main body for storage—also includes removable canopy and foldable/detachable seat assemblies).

None of these earlier designs embodies features to make them simultaneously convenient, portable, and entertaining for a child to ride in.

BRIEF SUMMARY

I have invented a child's stroller incorporating a conventional folding stroller frame and canopy, with a seat to hold a child, built into a vehicle style body that is not only decorative, but that also has unique functional characteristics in terms of folding frame storage, fun vehicle-like functionality for a child, and transport while folded.

The stroller includes a folding stroller frame incorporated into a vehicle style body, the vehicle body having its own wheels. The vehicle body has a passenger compartment area for mounting the stroller frame and seating a child, and a latching hood that can be unlatched to pivot forwardly away from the passenger area to accommodate a folding handle portion of the stroller frame in an empty engine compartment. The hood is returned to its latched state to secure the folded handle in the engine compartment.

In further form, the latching hood includes a windshield with an open frame positioned to provide a handhold or gripping bar for a child riding in the stroller and/or an adult opening and closing the hood for storage or deployment of the handle. In a further form the windshield is a latching windshield that can itself be unlatched relative to the hood in order to fold flat for reduced storage volume, or for improved access to a child in the stroller. In a preferred form the windshield latches are child-resistant so that only an adult may unlatch the windshield.

In a further form, the stroller includes a rear pull handle incorporated into the automobile body bumper, useful for lifting the rear wheels and towing the folded stroller on the front wheels.

In a further form, the stroller passenger compartment communicates with the forward "engine" storage compartment under the hood, and the forward storage compartment includes a foot-well so that a larger child in the stroller may put his or her feet. In an alternate form, a kick-plate or partition (permanent or removable) is located between the passenger compartment and the forward storage compartment to prevent a child from accessing the storage compartment.

In a further form, the stroller includes a utility tray in what would be the "dashboard" area of the auto body interior, accessible to a child riding in the stroller for holding snacks, toys and such.

These and other features and advantages of the invention will become apparent from the detailed description below, in light of the accompanying drawings.

BRIEF DESCRIPTION OF THE DRAWINGS

FIG. 4 is a side elevation view of the stroller of FIG. 1, from the driver side, showing the stroller push handle partially folded into the automobile body of the stroller.

FIG. 4A is a side elevation view of the stroller of FIG. 1, from the driver side, showing the stroller push handle fully folded into the automobile body of the stroller.

DETAILED DESCRIPTION

Figure 1:
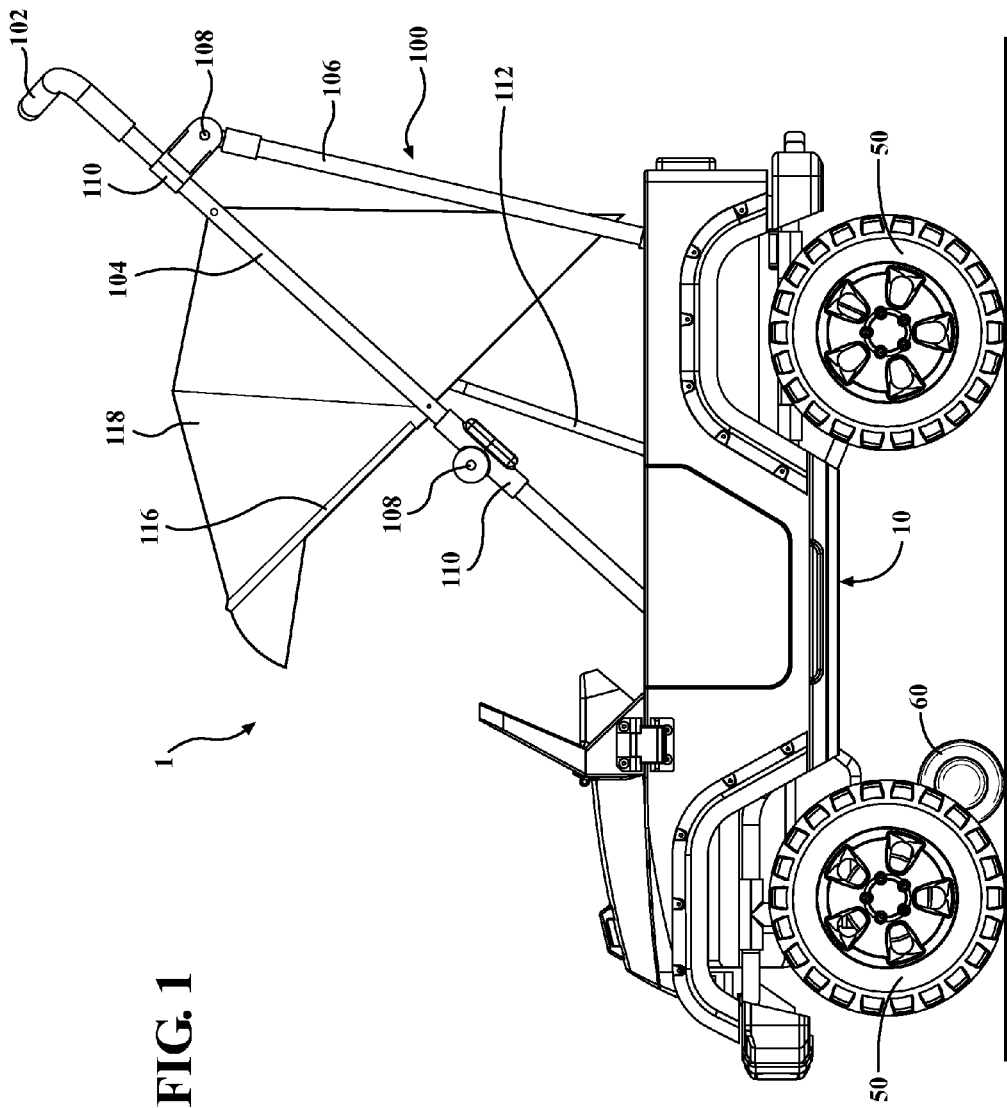
FIG. 1 is a side elevation view (from the "driver" side) of an example stroller according to the invention.
Figure 2:
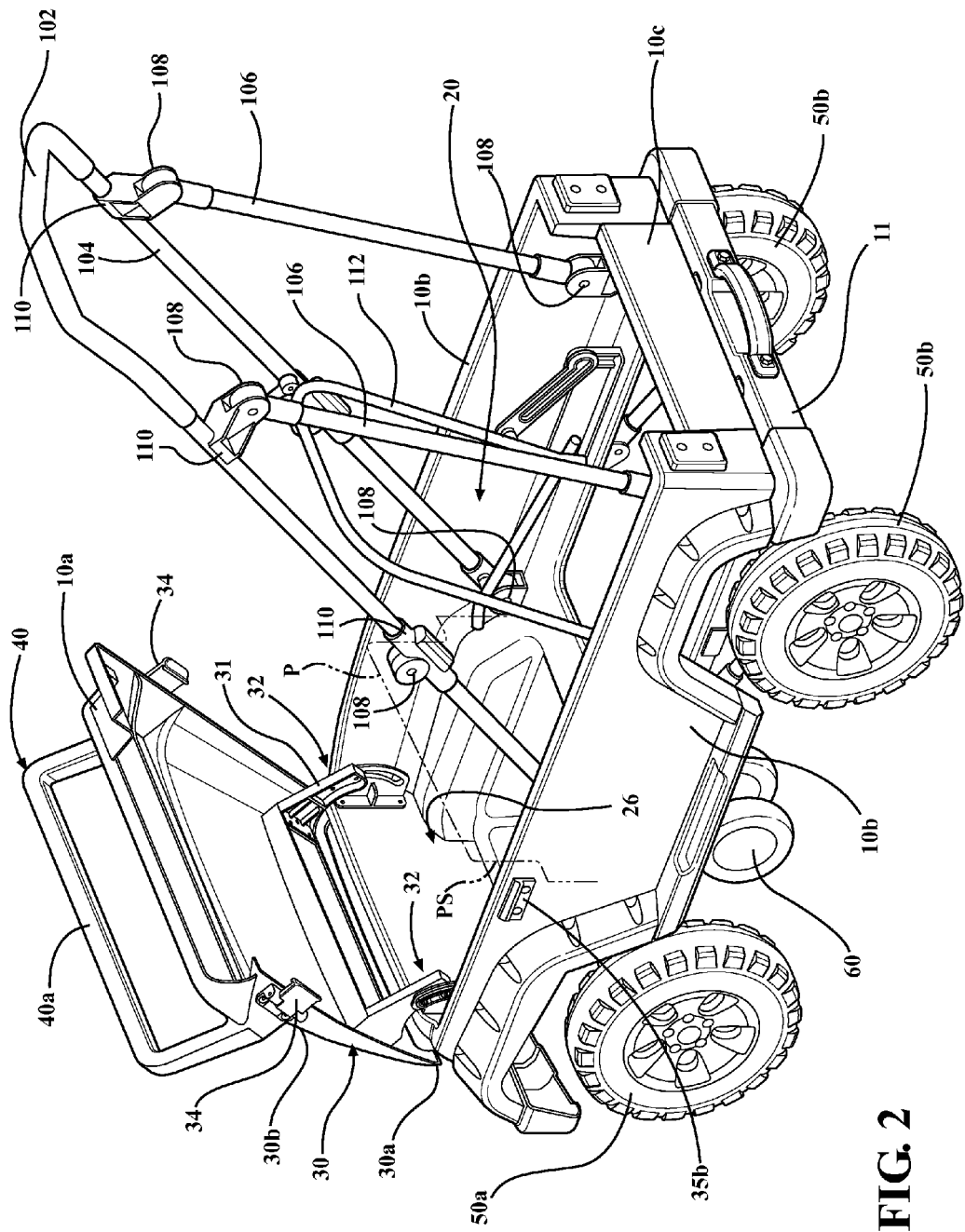
FIG. 2 is a rear perspective view of the stroller of FIG. 1, with the hood raised.
Figure 3:
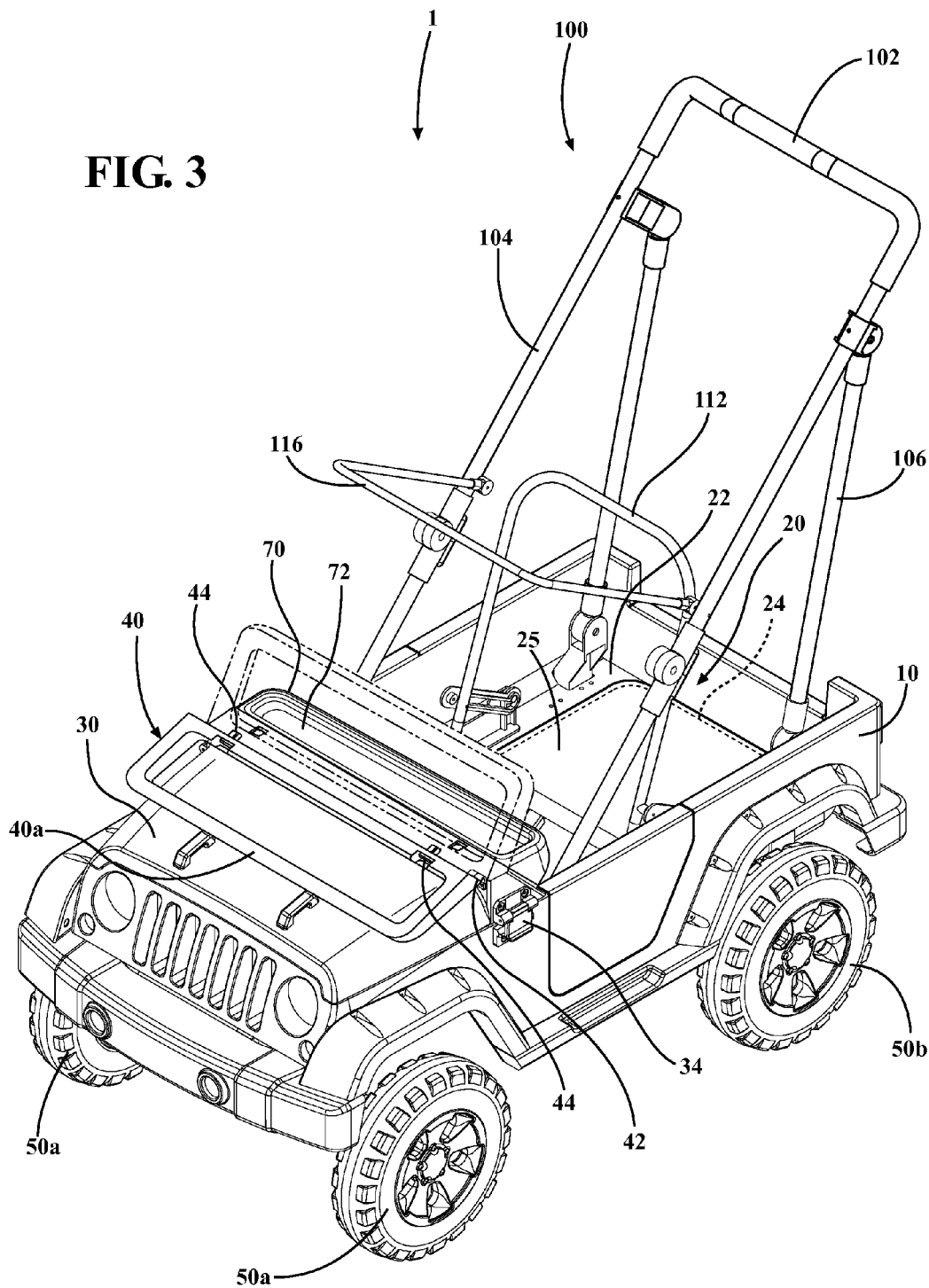
FIG. 3 is a front perspective view of the stroller of FIG. 1, with the windshield folded down.

Referring first to FIGS. 1 through 3, a child's stroller 1 according to the invention is shown in exemplary form in order to teach how to make and use the claimed invention. Stroller 1 includes a substantially rigid (i.e., non-fabric) vehicle-style body 10 that is both ornamental and functional, and a conventional folding stroller frame 100 secured to body 10. Vehicle body 10 in the illustrated example includes a set of automotive-type wheels 50, and a swivel caster set 60 associated with the front wheels 50.

Body 10 may be made from different materials using different methods, but in the illustrated and preferred form it is molded from (although not limited to) plastic. Body 10 is shown in the form of a "jeep" style auto body, but it will be understood that other vehicle styles are possible, including but not limited to sports cars, tractors, trucks, and the like. Body 10 may also have the appearance of a vehicle that does not normally have wheels, such as (but not limited to) a snowmobile, jet ski, aircraft or boat, in which case wheels 50 and/or any caster assembly 60 may be substantially disguised or hidden behind the sides or other features of the vehicle body. In the event that the body 10 does not have the appearance of a vehicle with a typical forward engine compartment closed by a hood, such as a car, truck, tractor, etc., a forward portion of body 10 may still be modified with a forward opening cowling, deck, or other forward body feature typical for that type of vehicle, located over a storage compartment forward of the passenger area—these too are included within the terms "hood" and "engine compartment" as used herein with respect to stroller 1.

Stroller frame 100 may be made from tubular metal members with various plastic components and linkages, in known fashion. The material and exact style and structure of the stroller frame is not critical to the invention, provided it is capable of being structurally connected to wheeled body 10 to push the stroller 1 from behind when extended and locked, and of being substantially folded down into the body 10 for storage and transport in the manner described further below. In the illustrated example, the stroller frame 100 may be a commercially available frame from a Kolcraft® brand stroller or similar, with the wheeled chassis or platform removed so that frame 100 can be secured directly at its lower ends to wheeled body 10. "Fold" can include various combinations of movement (pivoting, sliding, folding, telescoping) by which the extended frame may be collapsed or "folded" into the body 10.

Illustrated stroller frame 100 generally includes the following main components: a push handle 102 raised on handle/frame support tubes 104 and 106; various pivot links 108; sliding connector joints 110, some with releasable latches 110*a*; a U-shaped fabric seat support 112 supporting a fabric seat 114; and a U-shaped canopy support 116 supporting a fabric canopy 118. Further detail is shown in the drawings, but elaboration is not believed necessary as those skilled in the art will recognize both its structure and operation. Fabric seat and canopy portions 114 and 118 have been omitted from many Figures to better show features of body 10 and frame 100.

Figure 1A:
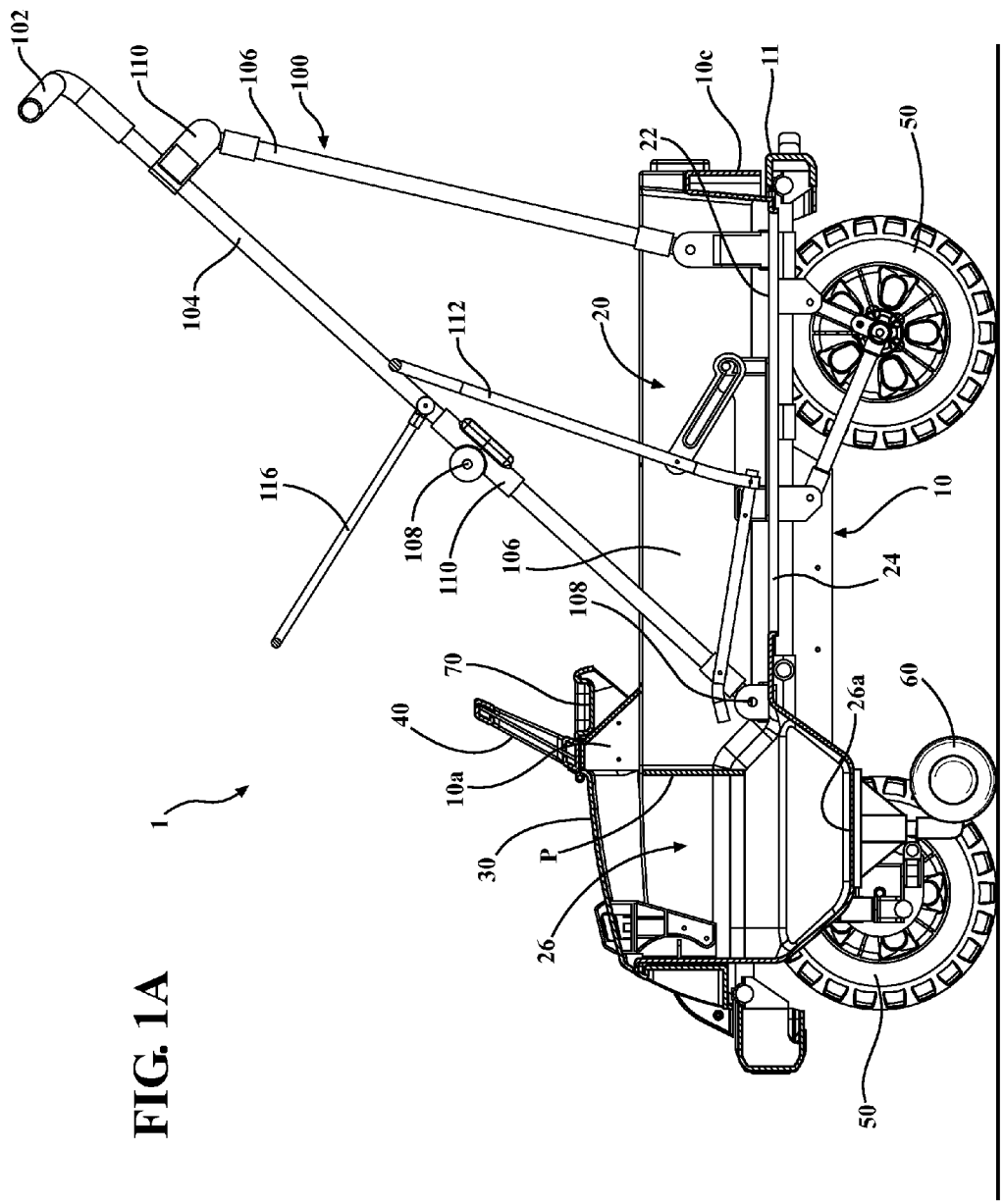
FIG. 1A is a side elevation cutaway view (driver side) of the stroller of FIG. 1.

As best shown in FIGS. 1A and 2, lower ends of the frame 100 are secured to a peripheral shelf 22 in the hollow interior "passenger" compartment area 20 of auto body 10, around an open floor area 24. Floor area 24 is shown open in some of the Figures, but will normally be closed off by a floor plate 25 (FIG. 3) to separate the passenger compartment 20 from the wheels, axles, caster and other chassis wheeled chassis structure underneath. Floor plate 25 may be removable for cleaning the interior passenger compartment, and to permit the use of body 10 as a toy or walk-behind if a child has outgrown the stroller and if the stroller frame 100 is removed from body 10. Attachment methods may vary, although in the illustrated example screws and/or bolts are used to secure the lower ends of the stroller frame members to the shelf 22. Interior 20 is defined between the dashboard region 10*a*, sides 10*b*, and rear 10*c* of body 10, substantially corresponding to the interior of a real vehicle. The substantially hollow, plastic stroller body 10 provides a lightweight, comforting, protective, and fun surround for a child in a stroller seat supported by frame 100 inside passenger compartment 20.

The wheels 50 and front swivel caster 60 on which the stroller 1 rides are rotatably mounted to the auto body 10, rather than to the stroller frame 100. Rear wheels 50*b* are positioned to be in constant contact with the ground. In the illustrated example the front wheels 50*a* are set at substantially the same level as the wheels of swivel caster 60, so as to be in substantially constant contact with the ground, although with less force and supporting less weight than rear wheels 50*b*. This five-point contact is believed to provide a smoother ride and pushing action, although there may be some minor skidding between front wheels 50*a* and the ground when turning. To reduce or eliminate such skidding, front wheels 50*a* may be pivotally attached to the body 10, in order to track turns, or may include other skid-preventing features. In the illustrated example, however, all four wheels 50 (front wheels 50*a* and rear wheels 50*b*) are mounted on fixed axles.

Alternately, and more conventionally, front wheels 50*a* may be raised above caster 60, out of contact with the ground. In this case, front wheels 50*a* may provide an anti-tipping function.

Alternately, some or all of wheels 50 on body 10 may be individually mounted to swivel or turn, eliminating the need for a separate swivel caster such as 60

Referring next to FIGS. 2 and 3, stroller body 10 is adapted to receive the folded stroller frame 100 for storage and transport. Passenger compartment 20 is sized to receive those portions of frame 100 that primarily translate downwardly when the frame is folded. Hood 30 is hinged to pivot up and forwardly away from the passenger area 20, allowing portions of stroller frame 100 (e.g., handle 102, upper ends of handle/frame support tubes 104 and 106, and possibly portions of canopy support 116) that translate forwardly during folding to be stored under the hood, in the empty "engine compartment" area 26 located forwardly of passenger interior area 20. Engine compartment storage area 26 defines a volume that may be partitioned from passenger compartment 20 by a plastic wall, kickplate, or similar structure P, for example with slots or other openings Ps located to permit portions of the stroller frame 100 to fold past the partition into the engine compartment 26. Partition P may be mounted to body 10 to stay in place when hood 30 is raised, or partition P may be mounted to the hood. Alternately, or additionally if partition P is removably attached to the body or hood, engine storage compartment 26 may include a foot-well 26*a* and communicate rearwardly with passenger interior area 20 below the upper edges of the body 10 (FIG. 1A), even when hood 30 is closed, allowing legroom for taller children riding in the stroller when the stroller frame is not stored under the hood. Engine storage compartment 26 (and any foot-well 26*a*) may be used to store toys, diaper bags, food and other items under the hood when compartment 26 is empty; i.e, when the stroller frame is deployed and not folded into body 10 for storage.

Hood 30 is pivotally connected at its forward end 30*a* to stroller body 10, for example on hinges 32, and releasably connected at its rear end 30*b* to stroller body 10, for example with latches 34. Hinges 32 provide stability to the hood 30 when being opened and closed, and limit the opening motion of hood 30 to a predetermined arc.

Figure 2A:
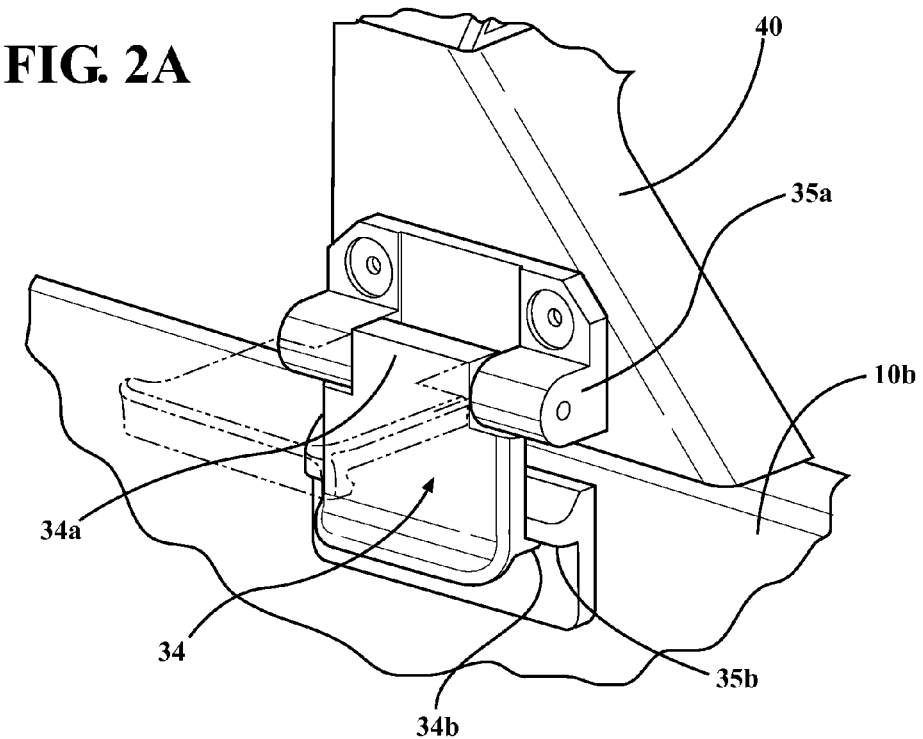
FIG. 2A is a detail perspective view of one of the hood latches in FIG. 2.

FIG. 2A shows detail of a currently preferred latch 34, which in the illustrated example is pivotally connected at its inner end 34*a* to a base 35*a* on hood 30, and which has a latch-hook outer end 34*b* releasably latched over a cam plate 35*b* or similar structure on body 10. The illustrated latches 34 are located on the outside of the vehicle body 10, making it simple for an adult to operate them but difficult for a child contained in the stroller seat in the interior 20 to reach. Hood latches 34 may take different forms, and are not limited to the illustrated example or location on the hood.

Figure 2B:
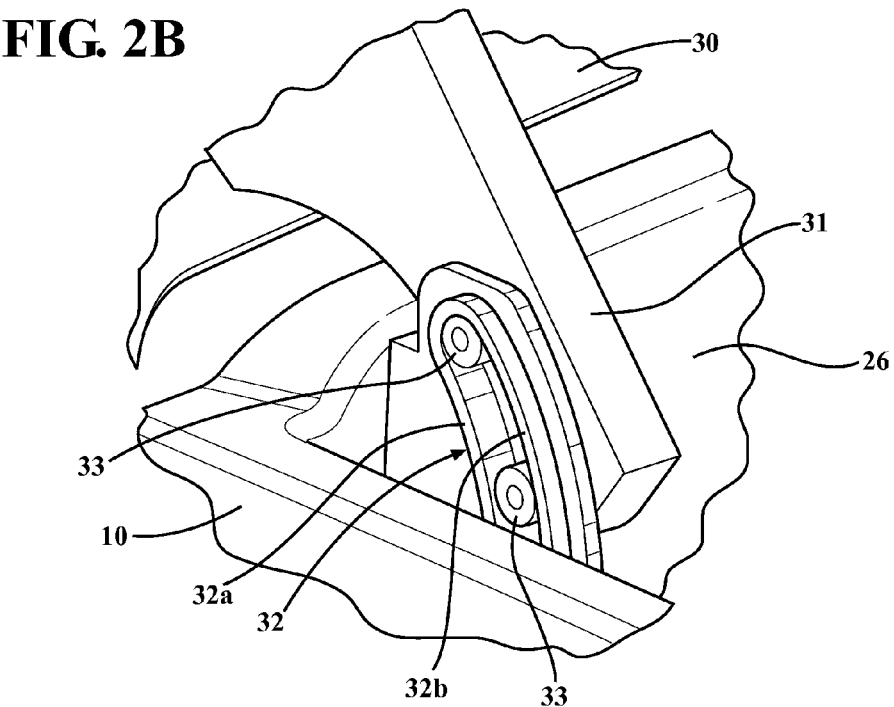
FIG. 2B is a detail perspective view of an inner side of one of the hood hinges in FIG. 2.
Figure 2C:
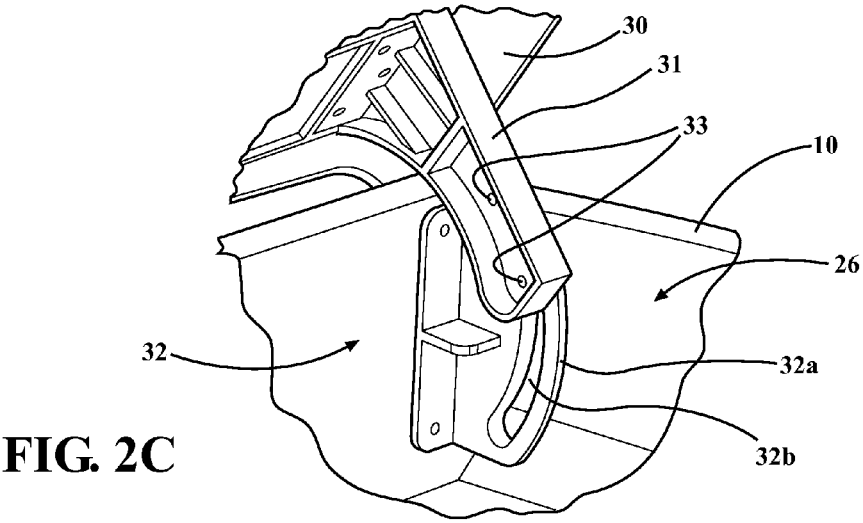
FIG. 2C is a detail perspective view of an outer side of one of the hood latches in FIG. 2.

FIGS. 2B and 2C show detail of a currently preferred type of hood hinge 32, in the illustrated example formed as a bracket 32*a* with an arcuate slot 32*b* on each side of the hood at its front corners. One or more followers 33 secured to the inner side of hood 30 by a post or arm 31 ride in slot 32*b*. The upper ends of slots 32*b* limit the opening movement of hood 30, and the fit between followers 33 and slot 32*b* may be sufficiently snug to hold hood 30 in the open position by friction, as best shown in FIG. 2. Other means for holding hood 30 in the open position may be used, including but not limited to releasable detents and interior latches. Hinges 32 allow hood 30 to open sufficiently to accept the forward-foldable portions of stroller frame 100 into the engine compartment 26.

Figure 3A:
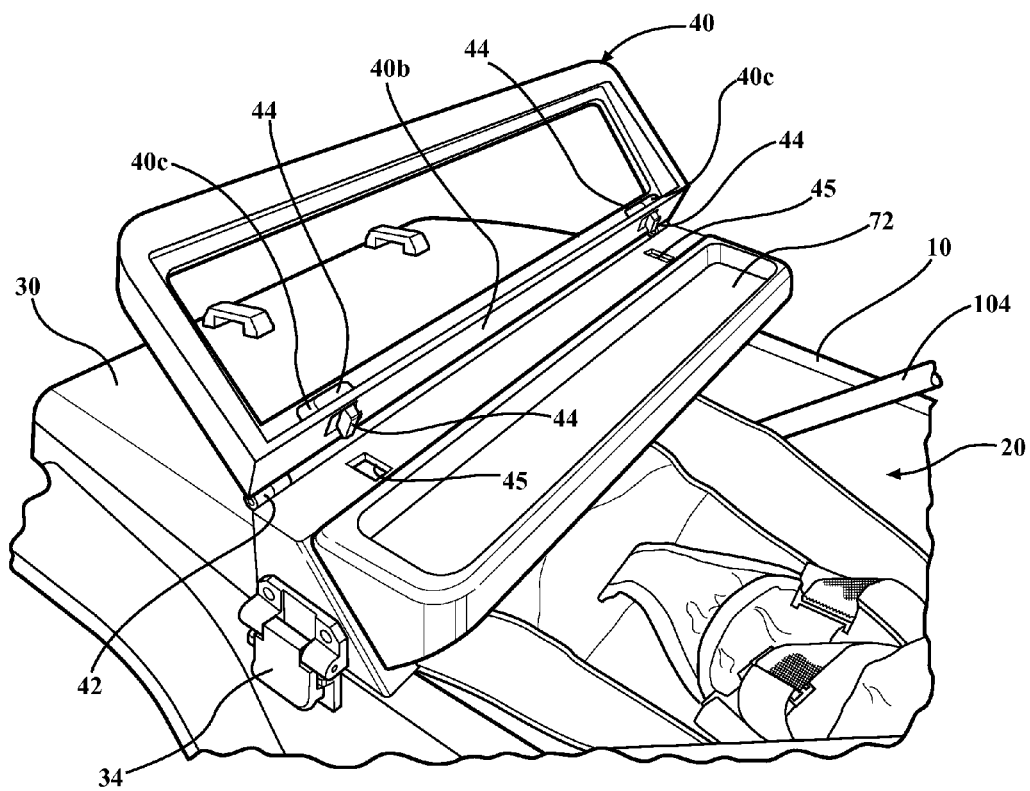
FIG. 3A is a rear perspective view of the stroller of FIG. 1, with the windshield unlatched and partially folded down.

FIGS. 3 and 3A show detail of windshield 40. Illustrated windshield 40 is actually a windowless windshield frame, without plastic or glass. This allows top frame member 40*a* to be used as a grab bar when the windshield is up, either by a child riding in the stroller or by an adult. Windshield 40 is preferably foldable to a flat storage position against hood 30, as best shown in FIGS. 3 and 4A, via hinges 42 on which it is pivotally mounted to the hood. Latches 44 associated with the lower frame member 40*b* are operable (by an adult) to lock windshield 40 in the raised position shown in FIGS. 1 and 2, and to unlock windshield 40 to be lowered against the hood. In the illustrated example, best shown in FIG. 3A, latches 44 are spring-loaded slide locks mounted in channels 40*c* in lower windshield frame member 40*b*, with detents or latch arms 44*a* that snap into engagement with cam members 45*a* in slots 45 in vehicle body 10 underneath the windshield frame. Latches 44 are preferably child-resistant by virtue of their spring bias to a latched condition, and by the need for both to be operated simultaneously to unlatch the windshield. Other forms of windshield latch means may be used, and are not limited to the illustrated slide lock example, or the illustrated location, although these are currently preferred.

FIG. 4 shows stroller frame 100 partway folded into body 10, with hood 30 raised to accept the forward folding portions 102 and upper ends of member 104 and 106 into compartment 26. FIG. 4A shows the stroller frame folded completely, with forward folding portions stored under the closed hood, and downward- and rearward-folding portions stored within the volume of interior 20. In the illustrated example of FIG. 4A, a small portion of the fabric seat support bar 112 extends from the rear of interior compartment 20 overlying the rear bumper 11. The extent to which any portion of the frame 100 may extend from interior compartment 20 will depend on the nature of the stroller frame, but in general most or all of the folded frame 100 will be contained in compartments 20 and 26 to keep the profile of the collapsed stroller 1 as flat as possible.

FIGS. 4 and 4A also show windshield 40 folded substantially flat against hood 30, also to minimize the height of the stroller 1 for storage.

Figure 5:
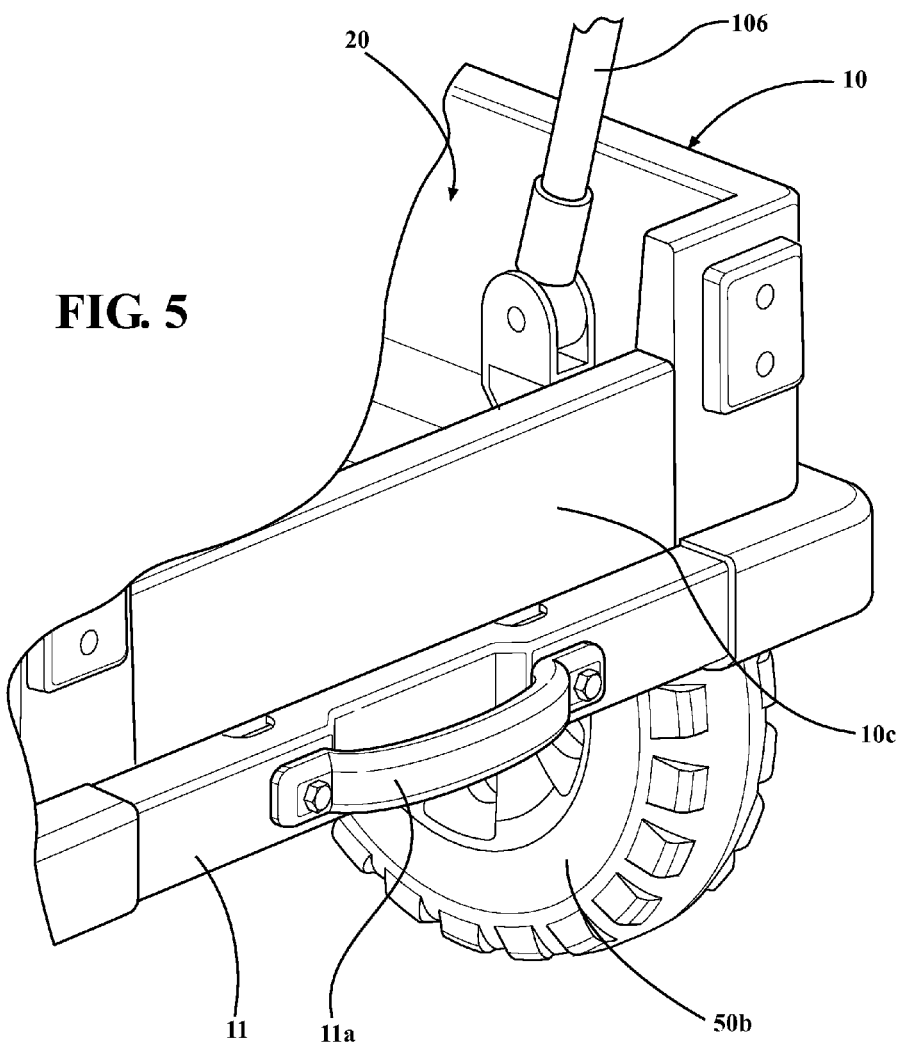
FIG. 5 is a rear perspective detail of a tow handle on the rear bumper of the stroller of FIG. 1.
Figure 5A:
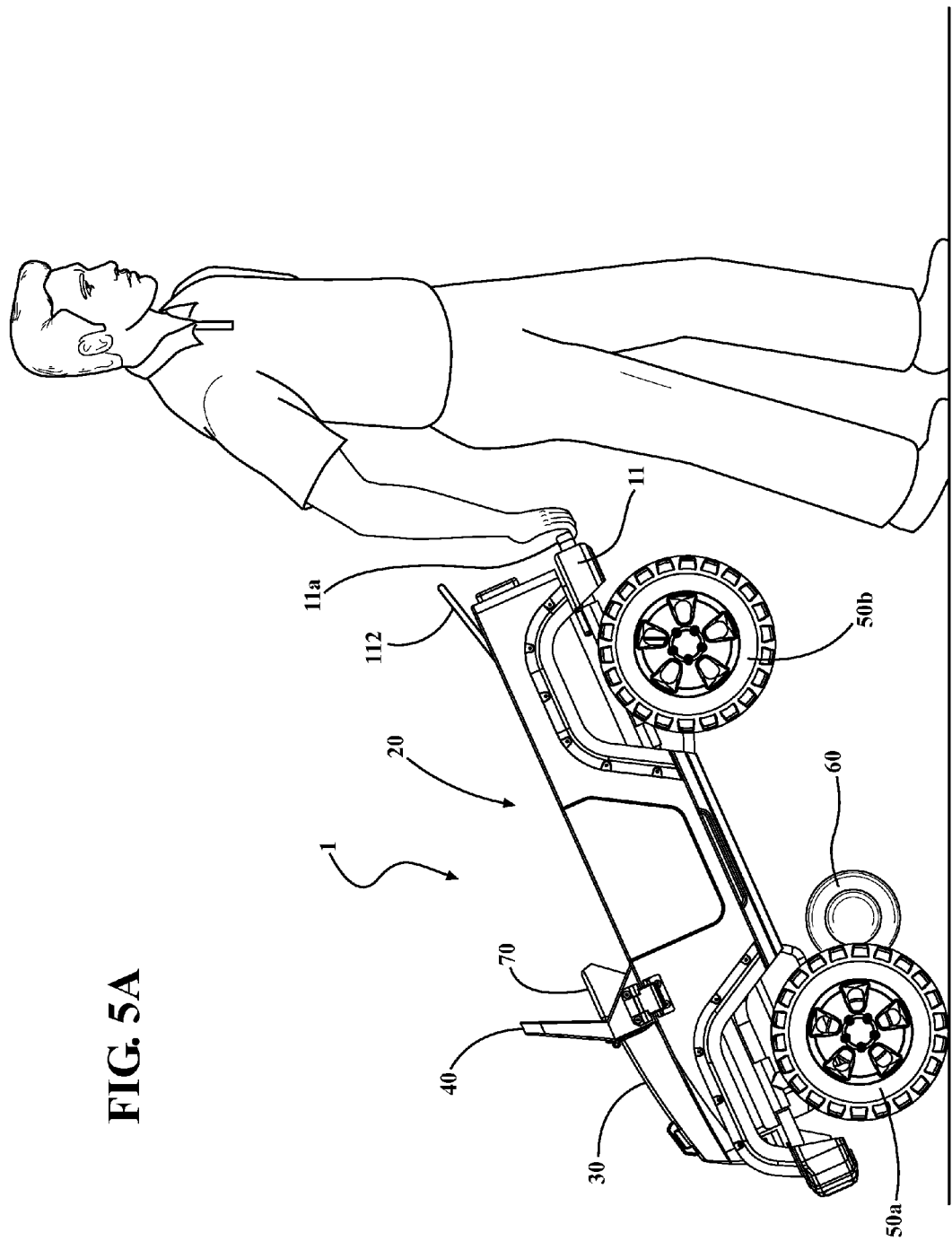
FIG. 5A is a side elevation view of the folded stroller being towed by the tow handle shown in FIG. 5.

FIGS. 5 and 5A show detail of the rear bumper 11 on body 10, in particular a pull handle 11*a* formed in or attached to the rear bumper. Handle 11*a* allows the stroller 1 to be pulled or towed by hand from behind, particularly on the front wheels 50*a* with rear wheels 50*b* raised off the ground when the stroller is folded flat as shown in FIG. 5A. Handle 11*a* also makes a convenient pull/push handle for a child when the stroller frame is folded into the body 10, or if the stroller frame is removed from the body 10 as the child outgrows the stroller, for play.

Various Figures show an optional, elongated dash tray 70 located at the front dash area 10*a* of body 10. Dash tray 70 includes one or more indentations or recesses 72 that provide a place for a child to put snacks or toys, or to provide a handhold.

It will be understood that the disclosed embodiments represent presently preferred examples of how to make and use the invention, but are intended to enable rather than limit the invention. Variations and modifications of the illustrated examples may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in the useful arts. The scope of the invention should accordingly be construed by what the above disclosure teaches and suggests to those skilled in the art, and by any claims that the above disclosure supports in this application or in any other application claiming priority to this application.

What is claimed is:

1. A stroller for infants and children, comprising:
    a stroller body having the appearance of an automotive vehicle, the body comprising a plurality of wheels rotatably mounted on the body, an open passenger compartment, and a forward storage compartment forward of the passenger compartment and covered by a forward-opening hinged hood, the hood including a forward end pivotally connected to the body adjacent a front end of the forward storage compartment farther from the open passenger compartment and a raisable rear end located adjacent a rear end of the forward storage compartment nearer the open passenger compartment;
    a wheel-less folding stroller frame secured in the open passenger compartment, the folding stroller frame being foldable between a raised, extended position extending from the open passenger compartment and supporting a seat in the open passenger compartment, and a lowered, folded position with a first portion of the folding stroller frame contained substantially within the open passenger compartment and with a second portion of the folding stroller frame contained within the forward storage compartment under the hood; wherein,
    the hood opens sufficiently forwardly by raising the rear end of the hood up and away from the open passenger compartment to permit the second portion of the folding stroller frame to be folded into the forward storage compartment.

2. The stroller of claim 1, wherein the open passenger compartment comprises an open floor below the seat supported by the folding stroller frame, the open floor closeable by a floor plate.

3. The stroller of claim 1, wherein the open passenger compartment comprises a peripheral shelf, and wherein a lower portion of the folding stroller frame is secured to the peripheral shelf.

4. The stroller of claim 1, wherein the hood comprises forward hinges and rear latches.

5. The stroller of claim 1, wherein the stroller body further comprises a windshield movable from a raised position to a storage position substantially flat against the hood.

6. The stroller of claim 5, wherein the windshield comprises an open frame with an upper frame member comprising a grab bar.

7. The stroller of claim 5, wherein the windshield is mounted on and moves with the hood.

8. The stroller of claim 1, wherein the stroller body comprises rear ground-contacting wheels, a forward swivel caster assembly, and forward ground-contacting wheels associated with the swivel caster assembly.

9. The stroller of claim 1, wherein the stroller body comprises a front dash area and a dash tray extending across a width of the open passenger compartment.

10. The stroller of claim 1, wherein the stroller body comprises a rear end comprising an exterior pull handle.

11. The stroller of claim 10, wherein the rear end includes a bumper, and the exterior pull handle is located on the bumper.

12. The stroller of claim 1, further comprising a legroom access opening between the open passenger compartment and the forward storage compartment when the hood is in a closed position, and further wherein the forward storage compartment comprises a foot-well.

13. The stroller of claim 1, wherein the open passenger compartment is separated from the forward storage compartment by a partition when the hood is in a closed position.

14. The stroller of claim 13, wherein the partition is removable.

* * * * *